US012123547B2

(12) United States Patent
Zou et al.

(10) Patent No.: US 12,123,547 B2
(45) Date of Patent: Oct. 22, 2024

(54) CLAMPING AND SUPPORTING APPARATUS FOR SMART MOBILE TERMINAL

(71) Applicant: Zhongshan firefly Image Technology Co., Ltd., Guangdong (CN)

(72) Inventors: Huaqiu Zou, Guangdong (CN); Gui Li, Guangdong (CN); Lifeng Yu, Guangdong (CN)

(73) Assignee: Zhongshan firefly Image Technology Co., Ltd., Guangdong (CN)

( * ) Notice: Subject to any disclaimer, the term of this patent is extended or adjusted under 35 U.S.C. 154(b) by 303 days.

(21) Appl. No.: 17/696,376

(22) Filed: Mar. 16, 2022

(65) Prior Publication Data

US 2022/0333736 A1    Oct. 20, 2022

(30) Foreign Application Priority Data

Apr. 16, 2021   (CN) .......................... 202120796125.5

(51) Int. Cl.
*F16M 11/04*        (2006.01)
*F16M 13/04*        (2006.01)
*G03B 17/56*        (2021.01)

(52) U.S. Cl.
CPC .......... *F16M 13/04* (2013.01); *F16M 11/041* (2013.01); *G03B 17/561* (2013.01)

(58) Field of Classification Search
CPC ...... F16M 11/041; F16M 13/04; F16M 11/04; F16M 11/105; G03B 17/561; G03B 17/563; H04M 1/04
See application file for complete search history.

(56) References Cited

U.S. PATENT DOCUMENTS

| | | | | |
|---|---|---|---|---|
| 10,174,879 B2* | 1/2019 | Zhao | ...................... | F16M 11/18 |
| 10,272,847 B1* | 4/2019 | Fan | ...................... | B60R 11/0241 |
| 10,932,601 B1* | 3/2021 | Fan | ...................... | F16M 13/02 |
| 11,050,909 B1* | 6/2021 | Jian | ...................... | F16M 11/041 |
| 11,473,601 B2* | 10/2022 | Fan | ...................... | F16M 11/2064 |
| 2014/0097306 A1* | 4/2014 | Hale | ...................... | H04M 1/12 |
| | | | | 248/274.1 |
| 2021/0109426 A1* | 4/2021 | Bei | ...................... | G03B 17/566 |
| 2021/0180748 A1* | 6/2021 | Guo | ...................... | H04M 1/04 |
| 2021/0392218 A1* | 12/2021 | Wu | ...................... | H04M 1/04 |
| 2022/0303375 A1* | 9/2022 | Chen | ...................... | F16M 13/04 |

* cited by examiner

*Primary Examiner* — Bradley Duckworth
(74) *Attorney, Agent, or Firm* — Day Pitney LLP; George Chaclas; Anthony A. Kassas

(57) ABSTRACT

Photography equipment, specifically a clamping and supporting apparatus for a smart mobile terminal, including an accommodating member and a mobile phone clamp assembly. The accommodating member includes an accommodating body and a connecting plate rotatably connected to the accommodating body. The mobile phone clamp assembly is disposed on the connecting plate and configured to be received in the accommodating body. The connecting plate rotates to allow the mobile phone clamp assembly to be received in the accommodating body. When the mobile phone clamp assembly is not in use, the connecting plate is rotated to allow the mobile phone clamp assembly to be received, so that space is saved and the accommodation and placement of the clamping and supporting apparatus are facilitated. The accommodating body is a handle, so that one can conveniently hold the accommodating body with one hand and open or close the connecting plate with the other hand.

10 Claims, 5 Drawing Sheets

CLAMPING AND SUPPORTING APPARATUS FOR SMART MOBILE TERMINAL

CROSS-REFERENCE TO RELATED APPLICATION

This application claims priority to Chinese Patent Application No. 202120796125.5, filed Apr. 16, 2021, which is incorporated herein by reference for all purposes.

TECHNICAL FIELD

The present disclosure relates to the technical field of photography equipment, and specifically to a clamping and supporting apparatus for a smart mobile terminal.

BACKGROUND

Nowadays society has entered the mobile data era. Mobile phones, tablet computers, and other smart mobile terminals have become an essential part of people's lives. Especially, at present, smart phones have been applied to all aspects of life. A photography support frame has emerged as a common tool in the photography industry.

An existing photography support frame is equipped with a mobile phone clamping device to facilitate clamping of a mobile phone for shooting. However, when not in use, a phone clamp on the photography support frame cannot be received, resulting in a large overall footprint of the photography support frame and a waste of space.

SUMMARY OF THE PRESENT DISCLOSURE

An objective of the present disclosure is to provide a clamping and supporting apparatus for a smart mobile terminal, to solve the technical problem that it is inconvenient to accommodate a mobile phone clamping device in the prior art.

To achieve the foregoing objective, the technical solution adopted in the present disclosure is to provide a clamping and supporting apparatus for a smart mobile terminal, including an accommodating member and a mobile phone clamp assembly, where the accommodating member includes an accommodating body and a connecting plate, and the connecting plate is rotatably connected to the accommodating body; and the mobile phone clamp assembly is disposed on the connecting plate and configured to be received in the accommodating body.

Further, the connecting plate is configured to cover an opening of the accommodating body or configured to be embedded in the accommodating body. An end of the connecting plate is rotatably connected to an end of the accommodating body by an arranged rotating member. The rotating member includes a rotating shaft and a reinforcement plate assembly, the reinforcement plate assembly is disposed on the connecting plate, and the reinforcement plate assembly is sleeved on the rotating shaft. The mobile phone clamp assembly is fixedly connected or rotatably connected to the connecting plate. The clamping and supporting apparatus for a smart mobile terminal further includes a camera fixing assembly disposed on a side of the accommodating member. The camera fixing assembly includes a supporting platform fixed on a side of the accommodating member and a connecting member protruding from the supporting platform. The camera fixing assembly further includes a knob, and the knob is configured to rotate to drive the connecting member to rotate. A mounting groove is provided at a bottom end of the supporting platform, the knob is disposed in the mounting groove and has an outer contour protruding from the mounting groove, and the connecting member passes through the supporting platform. A connecting portion for connecting a gimbal is disposed at a bottom end of the supporting platform.

Some beneficial effects of the present disclosure are as follows. First, the connecting plate is rotatably connected to the accommodating body. The mobile phone clamp assembly is disposed on the connecting plate. The connecting plate rotates to allow the mobile phone clamp assembly to be received in the accommodating body. When the mobile phone clamp assembly is not in use, the connecting plate is rotated to allow the mobile phone clamp assembly to be received, so that the space is saved and the accommodation and placement of the clamping and supporting apparatus are facilitated. The accommodating body is disposed in a handle shape to facilitate gripping, so that it is convenient to hold the accommodating body with one hand and open or close the connecting plate with the other hand. In addition, it is convenient to hold the accommodating body to mount the entire clamping and supporting apparatus on a gimbal.

Second, because the connecting plate is relatively thin, the reinforcement plate assembly is disposed at an end of the connecting plate close to the accommodating body. The reinforcement plate assembly is disposed to increase the structural strength of the connecting plate, making the connecting plate more stable to avoid shaking.

Third, one side of the reinforcement plate assembly is fixed on the connecting plate, the other side is sleeved on a damping shaft, and after rotation, the reinforcement plate assembly is configured to be received in the accommodating body. A limit groove for embedding the reinforcement plate assembly is provided in the accommodating body. The limit groove is provided to limit a movement position of the reinforcement plate assembly. The limit groove positions the movement of the connecting plate, making it convenient to accurately cover the accommodating body with the connecting plate.

Fourth, when the mobile phone clamp assembly is rotatably connected to the connecting plate, the mobile phone clamp assembly is fixed on the connecting plate by a damping member, and the mobile phone clamp assembly is rotatably adjustable on the connecting plate, to facilitate position adjustment of a mobile phone. In addition, the damping member can implement damping positioning for the connecting plate after rotation, to prevent the mobile phone clamp assembly from shaking, making the mobile phone clamp assembly clamping a mobile phone more stable to facilitate shooting.

Fifth, the camera fixing assembly is disposed, so that the clamping and supporting apparatus can both fix a mobile phone and a camera, and the camera or the mobile phone can be easily clamped and used without any disassembly steps, to provide a user with convenience.

Sixth, the mounting groove is provided at the bottom end of the supporting platform, the knob is disposed in the mounting groove and has an outer contour protruding from the mounting groove, and the connecting member passes through the supporting platform. The knob is turned, and after rotating, the knob can drive the connecting member to rotate, so that the connecting member is screwed in a threaded hole of a camera, to implement fixed connection of the camera.

BRIEF DESCRIPTION OF THE DRAWINGS

To describe the technical solutions in specific embodiments of the present disclosure or the prior art more clearly, the following briefly introduces the accompanying drawings required for describing the specific embodiments or the prior art. Apparently, the accompanying drawings in the following description show some embodiments of the present disclosure, and a person of ordinary skill in the art may still derive other drawings from these accompanying drawings without creative efforts.

Figure 1:
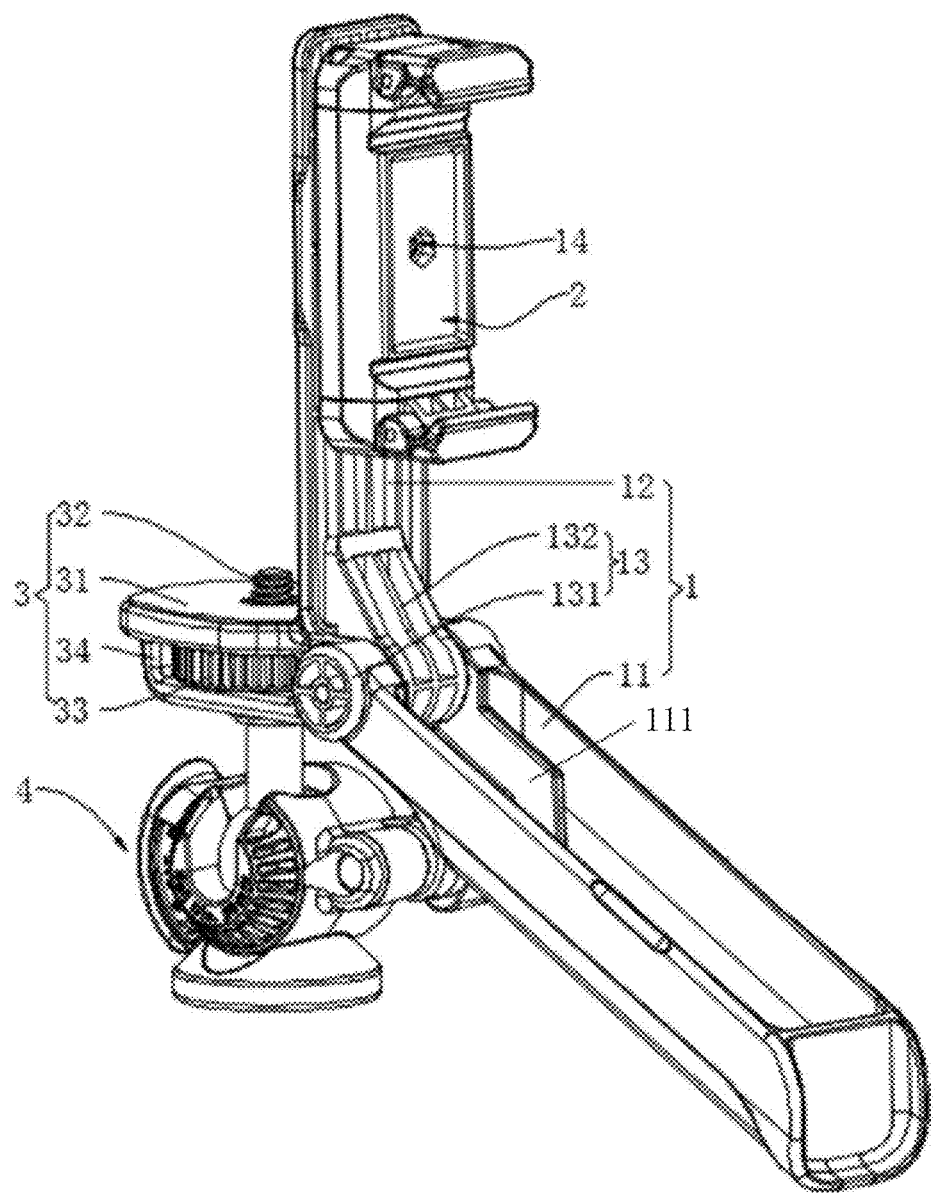
FIG. 1 is a schematic diagram of a first use state of a clamping and supporting apparatus for a smart mobile terminal according to an embodiment of the present disclosure.

Reference numerals: 1. accommodating member; 11. accommodating body; 111. limit groove; 12. connecting plate; 13. rotating member; 131. rotating shaft; 132. reinforcement plate assembly; 14. damping member; 141. bolt; 142. spring; 143. nut; 2. mobile phone clamp assembly; 3. camera fixing assembly; 31. supporting platform; 32. connecting member; 33. knob; 34. mounting groove; and 4. gimbal.

DETAILED DESCRIPTION

The following clearly and completely describes the technical solutions of the present disclosure with reference to the accompanying drawings. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

In the description of the present disclosure, it needs to be understood that orientation or location relationships indicated by terms "center", "up", "down", "left", "right", "vertical", "horizontal", "inside", and "outside" are based on orientation or location relationships shown in the accompanying drawings, and are only used to facilitate description of the present disclosure and simplify description, but are not used to indicate or imply that the apparatuses or elements must have specific orientations or are constructed and operated by using specific orientations, and therefore, cannot be understood as a limit to the present disclosure. In addition, the terms "first", "second", and "third" are used only for description, but are not intended to indicate or imply relative importance.

In the description of the present disclosure, it needs to be noted that unless otherwise expressly specified and defined, "mounted", "connected", and "connection", should be understood in a broad sense, for example, fixedly connected, detachably connected or integrally connected; or mechanically connected or electrically connected; or connected directly or indirectly through an intermediate, or two elements communicated internally. For a person of ordinary skill in the art, specific meanings of the terms in the present disclosure should be understood according to specific conditions.

In addition, the technical features involved in different embodiments of the present disclosure described below can be combined with each other as long as they do not constitute a conflict between them.

Figure 2:
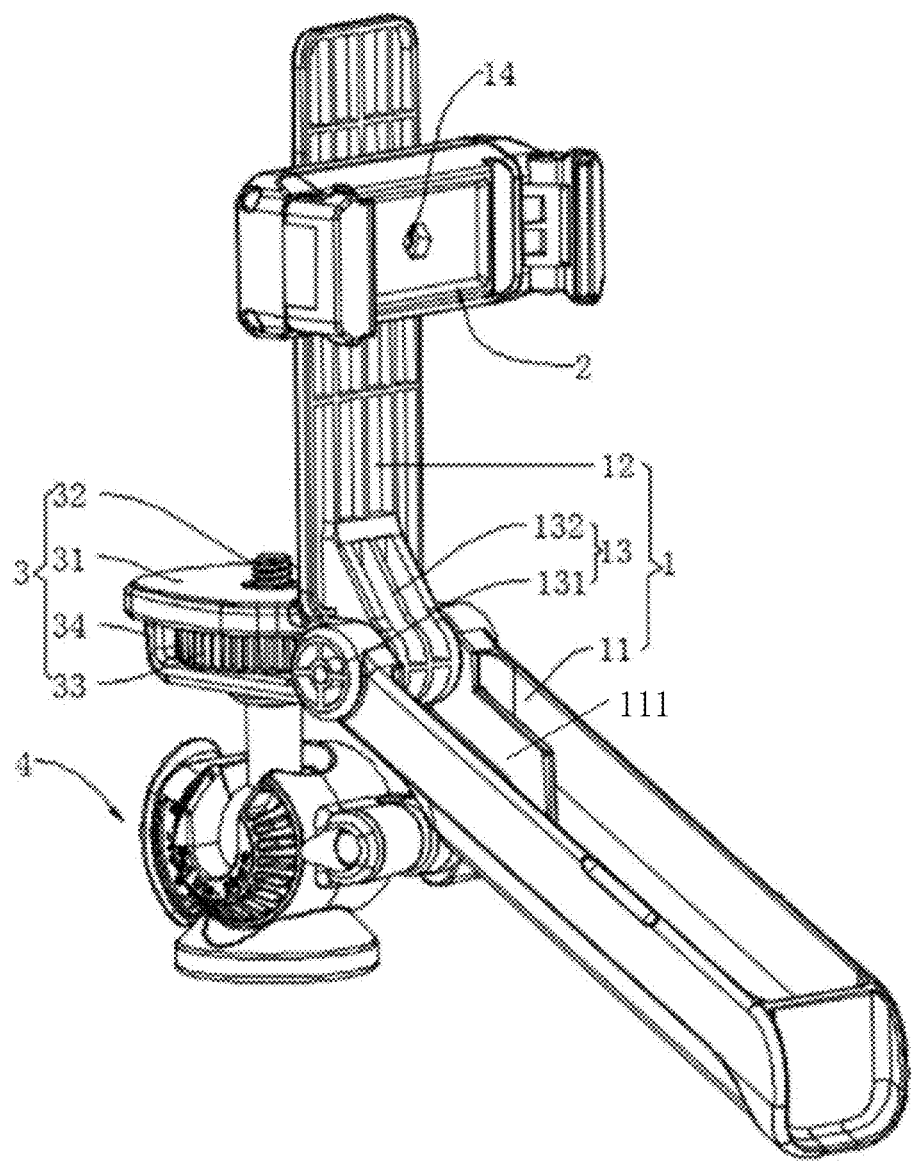
FIG. 2 is a schematic diagram of a second use state of a clamping and supporting apparatus for a smart mobile terminal according to an embodiment of the present disclosure.
Figure 3:
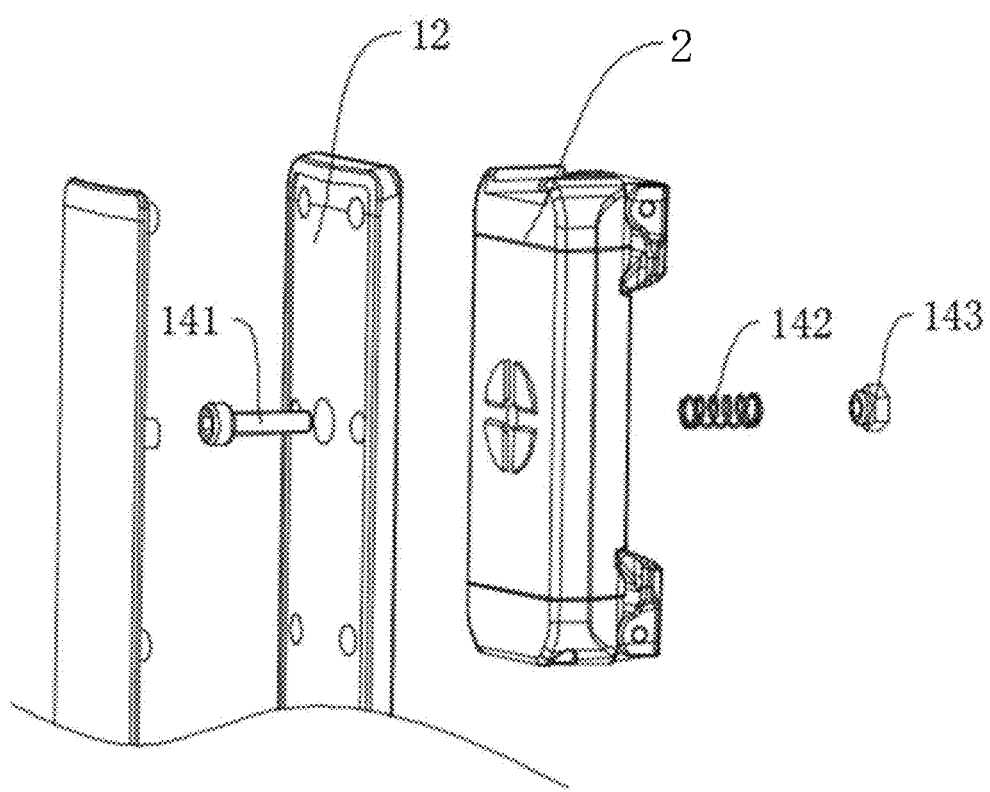
FIG. 3 is a schematic structural exploded view of a damping member used in a clamping and supporting apparatus for a smart mobile terminal according to an embodiment of the present disclosure.
Figure 4:
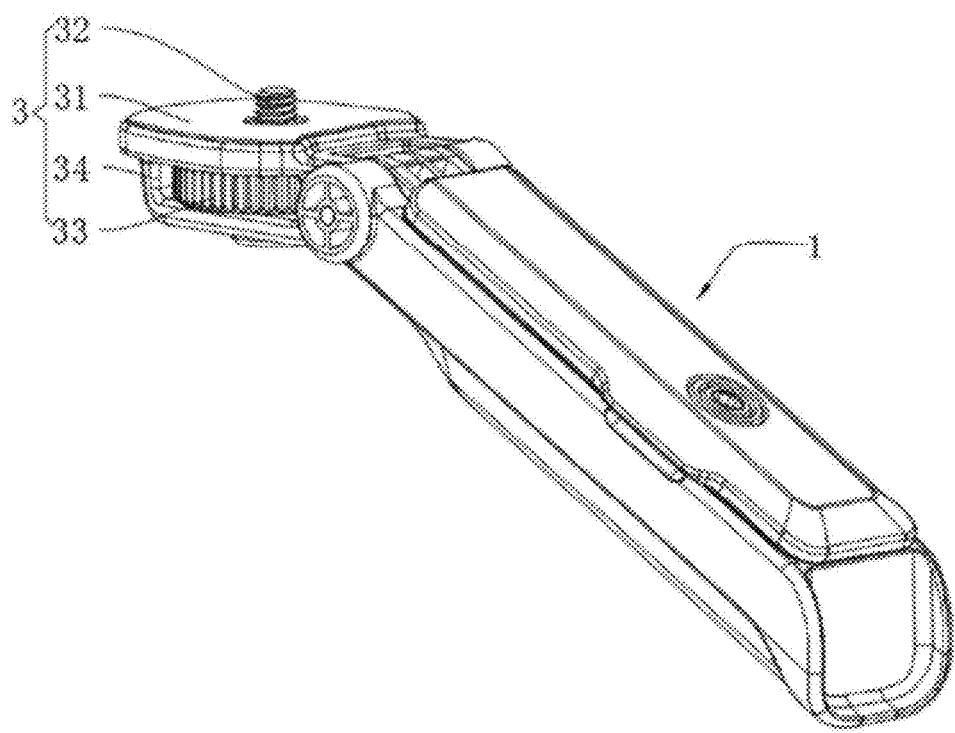
FIG. 4 is a schematic diagram of a received state of a clamping and supporting apparatus for a smart mobile terminal according to an embodiment of the present disclosure.
Figure 5:
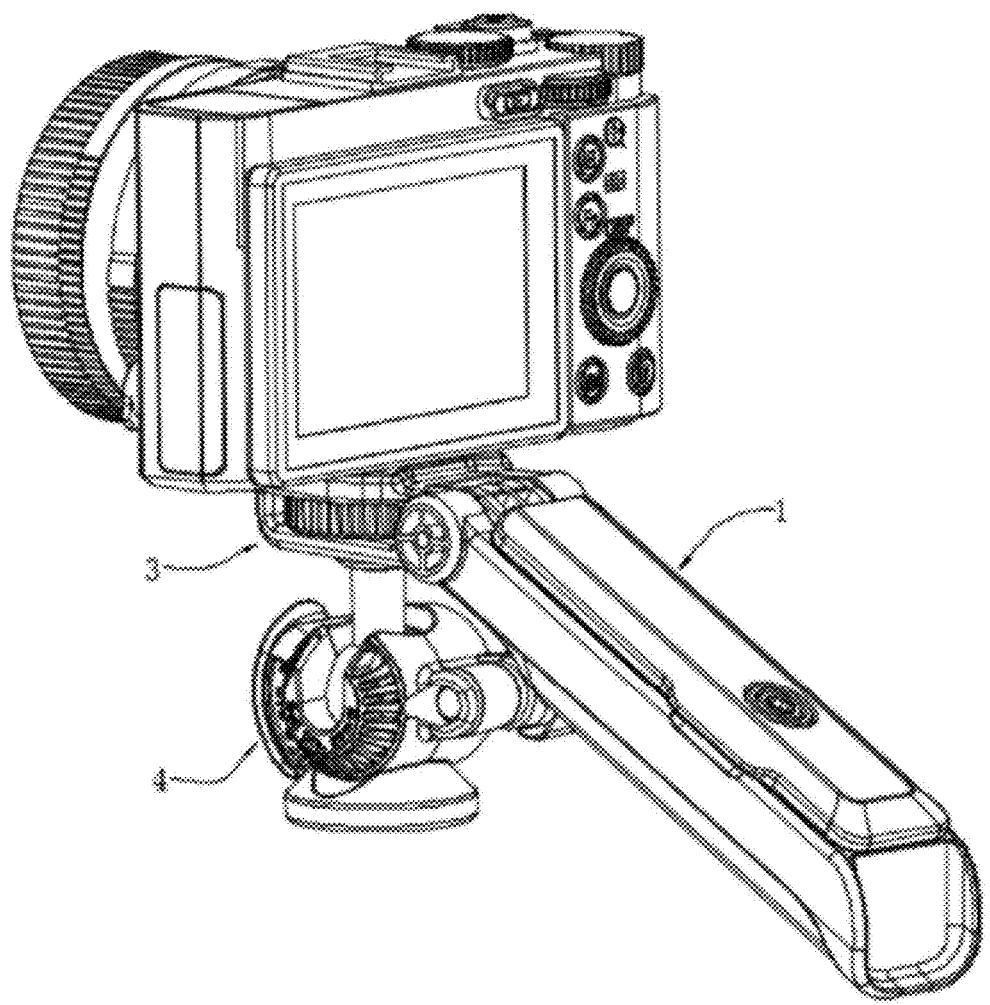
FIG. 5 is a schematic diagram of a third use state of a clamping and supporting apparatus for a smart mobile terminal according to an embodiment of the present disclosure.

Referring to FIG. 1 to FIG. 5, a clamping and supporting apparatus for a smart mobile terminal provided in an embodiment of the present disclosure includes an accommodating member 1, a mobile phone clamp assembly 2, and a camera fixing assembly 3. The accommodating member 1 includes an accommodating body 11 and a connecting plate 12. The connecting plate 12 is rotatably connected to the accommodating body 11. The mobile phone clamp assembly 2 is disposed on the connecting plate 12 and configured to be received in the accommodating body 11. The connecting plate 12 is rotatably connected to the accommodating body 11. The mobile phone clamp assembly 2 is disposed on the connecting plate 12. The connecting plate 12 rotates to allow the mobile phone clamp assembly 2 to be received in the accommodating body 11. When the mobile phone clamp assembly 2 is not in use, the connecting plate 12 is rotated to allow the mobile phone clamp assembly 2 to be received, so that the space is saved and the accommodation and placement of the clamping and supporting apparatus are facilitated.

Specifically, the accommodating body 11 is a cuboid shape with an opening at the top. The connecting plate 12 covers the opening of the accommodating body 11 through an arranged buckle structure. The accommodating body 11 is disposed in a cuboid handle shape to facilitate gripping, so that it is convenient to hold the accommodating body 11 with one hand and open or close the connecting plate 12 with the other hand. In addition, it is convenient to hold the accommodating body 11 to mount the entire clamping and supporting apparatus on a gimbal 4.

In a variant embodiment, the connecting plate 12 may be further embedded in the accommodating body 11 through the arranged buckle structure and is clamped with an inner side wall of the accommodating body 11. The connecting plate 12 may further cover the accommodating body 11 or be embedded in the accommodating body 11 in a magnetic attraction manner. The accommodating body 11 may be disposed in any shape with an opening at an end, as long as the mobile phone clamp assembly 2 can be received inside the accommodating body 11.

Further, an end of the connecting plate 12 is rotatably connected to an end of the accommodating body 11 by an arranged rotating member 13.

Specifically, the rotating member 13 includes a rotating shaft 131 and a reinforcement plate assembly 132. The reinforcement plate assembly 132 is disposed at an end of the connecting plate 12 close to the accommodating body 11. The reinforcement plate assembly 132 and the connecting plate 12 are integrally formed. The reinforcement plate assembly 132 is sleeved on the rotating shaft 131. Because the connecting plate 12 is relatively thin, the reinforcement plate assembly 132 is disposed to increase the structural strength of the connecting plate 12, making the connecting plate 12 more stable to avoid shaking. A mesh-form reinforcement rib is provided on a surface of the connecting plate 12 that can be received in the accommodating body 11. A limit groove 111 for embedding the reinforcement plate assembly 132 is provided in the accommodating body 11. Two vertical plates are used for the limit groove 111. The two vertical plates are disposed opposite each other, and a space between the two vertical plates forms the limit groove 111. When the reinforcement plate assembly 132 is embedded in the limit groove 111, two side walls of the reinforcement plate assembly 132 are respectively in contact with side walls of the limit groove 111. The limit groove 111 is provided to limit a movement position of the reinforcement plate assembly 132. The limit groove 111 positions the movement of the connecting plate 12, making it convenient to accurately cover the accommodating body 11 with the connecting plate 12. After the connecting plate 12 has been repeatedly opened and closed, the position accuracy is not prone to change. A damping shaft is used for the rotating shaft 131. The damping shaft uses a limit protrusion and a limit clamping groove to implement rotation and implement damping fixation. The arranged damping shaft can implement damping positioning for the connecting plate 12 after rotation, to prevent the connecting plate 12 from shaking, making the mobile phone clamp assembly 2 clamping a mobile phone more stable to facilitate shooting.

In a variant embodiment, the rotating shaft 131 may use a common pin shaft. The damping shaft may alternatively use bolt and nut fastening for damping fixation.

Further, when the mobile phone clamp assembly 2 is rotatably connected to the connecting plate 12. The mobile phone clamp assembly 2 is fixed on the connecting plate 12 by a damping member 14. The mobile phone clamp assembly 2 is rotatably adjustable on the connecting plate 12, to facilitate position adjustment of a mobile phone. In addition, the damping member 14 can implement damping positioning for the connecting plate 12 after rotation, to prevent the mobile phone clamp assembly 2 from shaking, making the mobile phone clamp assembly 2 clamping a mobile phone more stable to facilitate shooting.

Specifically, the damping member 14 includes a bolt 141, a spring 142, and a nut 143. Both the connecting plate 12 and the mobile phone clamp assembly 2 are provided with mounting holes that are in communication. The bolt 141 passes through the connecting plate 12 and the mobile phone clamp assembly 2 and has a head end clamped with the connecting plate 12. The spring 142 is sleeved on the bolt 141 and has one end abutting against the connecting plate 12 and the other end abutting against the mobile phone clamp assembly 2. The nut 143 fixes the bolt 141 and the spring 142. Because the spring 142 remains under the action of a force and is pressed on the mobile phone clamp assembly 2, it is ensured that the mobile phone clamp assembly 2 can keep implementing damping positioning.

In a variant embodiment, the damping member 14 may alternatively use bolt and nut fastening for damping fixation. The damping member 14 may instead use the cooperation of a positioning pin and a positioning hole to fix the mobile phone clamp assembly 2 after rotation. The mobile phone clamp assembly 2 may be alternatively disposed on the connecting plate 12.

Further, the clamping and supporting apparatus for a smart mobile terminal further includes a camera fixing assembly 3 disposed on a side of the accommodating member 1.

Specifically, the camera fixing assembly 3 includes a supporting platform 31 fixed on a side of the accommodating member 1 and a connecting member 32 protruding from the supporting platform 31. The camera fixing assembly 3 is disposed, so that the clamping and supporting apparatus can both fix a mobile phone and a camera, and the camera or the mobile phone can be easily clamped and used without any disassembly steps, to provide a user with convenience. A connecting portion for connecting a gimbal 4 is disposed at a bottom end of the supporting platform 31. In this embodiment, a mounting groove 34 is provided at a bottom end of the supporting platform 31. The mounting groove 34 has a through groove shape provided with openings at two ends. The camera fixing assembly 3 further includes a knob 33. The knob 33 is fixed in the mounting groove 34 at the bottom end of the connecting member 32 and has an outer contour protruding from the mounting groove 34. In this embodiment, outer contours on two sides of the knob 33 are both disposed protruding from two ends of the mounting groove 34. The rotation of the knob 33 can be implemented by turning the outer contour of the knob 33 at either end of the mounting groove 34. The connecting member 32 passes through the supporting platform 31. The connecting member 32 uses a screw. The knob 33 rotatably drives the connecting member 32 to rotate. The knob 33 is turned, and after rotating, the knob 33 can drive the connecting member 32 to rotate, so that the connecting member 32 is screwed in a threaded hole of the camera, to implement fixed connection of a camera. A connecting portion for connecting a gimbal 4 is disposed at a bottom end of the mounting groove 34. In this embodiment, the connecting portion uses an insertion slot. The insertion slot may be replaced with an insertion rod for direct insertion on the gimbal 4 through the insertion rod.

In a variant embodiment, the knob 33 may be disposed on a side of the connecting member 32, as long as a transmission assembly is connected to implement that the knob 33 is configured to rotate to drive the connecting member 32 to rotate. The camera fixing assembly 3 may alternatively use a fixing member such as a clip, and the clip is used to directly clamp and fix a camera.

The embodiments of this specific implementation are preferred embodiments of the present disclosure, but are not used to limit the scope of protection of the present disclosure. Therefore, all equivalent changes made according to the structure, shape, and principle of the present disclosure shall fall within the scope of protection of the present disclosure.

The invention claimed is:

1. A clamping and supporting apparatus for a smart mobile terminal, comprising:
    an accommodating member, comprising an accommodating body and a connecting plate, the connecting plate being rotatably connected to the accommodating body;
    a mobile phone clamp assembly, disposed on the connecting plate, and configured to be received in the accommodating body; and
    a camera fixing assembly disposed on a side of the accommodating member,
    wherein,
    the camera fixing assembly comprises a supporting platform fixed on a side of the accommodating member and a connecting member protruding from the supporting platform, and
    the camera fixing assembly further comprises a knob, and the knob is configured to rotate to drive the connecting member to rotate.

2. The clamping and supporting apparatus for a smart mobile terminal according to claim 1, wherein the connecting plate is configured to cover an opening of the accommodating body or configured to be embedded in the accommodating body.

3. The clamping and supporting apparatus for a smart mobile terminal according to claim 1, wherein an end of the connecting plate is rotatably connected to an end of the accommodating body by an arranged rotating member.

4. The clamping and supporting apparatus for a smart mobile terminal according to claim 3, wherein the rotating member comprises a rotating shaft and a reinforcement plate assembly, the reinforcement plate assembly is disposed on the connecting plate, and the reinforcement plate assembly is sleeved on the rotating shaft.

5. The clamping and supporting apparatus for a smart mobile terminal according to claim 1, wherein the mobile phone clamp assembly is fixedly connected or rotatably connected to the connecting plate.

6. The clamping and supporting apparatus for a smart mobile terminal according to claim 1, wherein a mounting groove is provided at a bottom end of the supporting platform, the knob is disposed in the mounting groove and has an outer contour protruding from the mounting groove, and the connecting member passes through the supporting platform.

7. The clamping and supporting apparatus for a smart mobile terminal according to claim 1, wherein a connecting portion for connecting a gimbal is disposed at a bottom end of the supporting platform.

8. A clamping and supporting apparatus for photography comprising:
   a handle assembly including: an accommodating body configured for manually gripping; a connecting plate rotatably connected to the accommodating body; and a phone clamp assembly coupled to the connecting plate; and
   a camera fixing assembly coupled to the handle assembly, wherein:
   in a phone use state, the connecting plate is rotated away from the accommodating body so that a phone can be mounted to the phone clamp assembly;
   in a camera use state, the connecting plate is rotated against the accommodating body with the phone clamp assembly housed within the accommodating body so that a camera can be mounted to the camera fixing assembly, and
   the accommodating body forms a channel, the connecting plate includes extending wings and, in the camera use state, the phone clamp assembly is within the channel and the extending wings are against the accommodating body to act as a travel stop and grip point to rotate the connecting plate to the camera use state.

9. A clamping and supporting apparatus as recited in claim 8, wherein the phone clamp assembly is rotatably mounted to the connecting plate.

10. A clamping and supporting apparatus for a smart mobile terminal, comprising:
   an accommodating member, comprising an accommodating body and a connecting plate, the connecting plate being rotatably connected to the accommodating body;
   a mobile phone clamp assembly, disposed on the connecting plate, and configured to be received in the accommodating body; and
   a camera fixing assembly disposed on a side of the accommodating member,
   wherein:
   the camera fixing assembly comprises a supporting platform fixed on a side of the accommodating member and a connecting member protruding from the supporting platform, and
   a connecting portion for connecting a gimbal is disposed at a bottom end of the supporting platform.

* * * * *